United States Patent
Ophir (10) Patent No.: US 12,530,791 B2
(45) Date of Patent: Jan. 20, 2026

(54) METHODS AND SYSTEMS FOR ENHANCING DEPTH PERCEPTION OF A NON-VISIBLE SPECTRUM IMAGE OF A SCENE

(71) Applicant: ELBIT SYSTEMS LTD., Haifa (IL)

(72) Inventor: Yoav Ophir, Haifa (IL)

(73) Assignee: ELBIT SYSTEMS LTD., Haifa (IL)

( * ) Notice: Subject to any disclaimer, the term of this patent is extended or adjusted under 35 U.S.C. 154(b) by 316 days.

(21) Appl. No.: 18/331,203

(22) Filed: Jun. 8, 2023

(65) Prior Publication Data

US 2023/0326058 A1    Oct. 12, 2023

Related U.S. Application Data

(63) Continuation of application No. PCT/IL2021/051467, filed on Dec. 9, 2021.

(60) Provisional application No. 63/287,092, filed on Dec. 8, 2021.

(30) Foreign Application Priority Data

Dec. 9, 2020 (IL) .......................... 279342

(51) Int. Cl.
*G06T 7/586* (2017.01)
*G06T 11/00* (2006.01)

(52) U.S. Cl.
CPC .............. *G06T 7/586* (2017.01); *G06T 11/00* (2013.01); *G06T 2207/10048* (2013.01); *G06T 2207/20092* (2013.01)

(58) Field of Classification Search
CPC .... H04N 13/122; H04N 13/271; G02B 30/40; G06T 17/00
See application file for complete search history.

(56) References Cited

U.S. PATENT DOCUMENTS

| | | |
|---|---|---|
| 6,157,733 A | 12/2000 | Swain |
| 6,252,982 B1 | 6/2001 | Haisma et al. |
| 9,798,388 B1 * | 10/2017 | Murali ................. G06F 3/0487 |
| 9,995,936 B1 | 6/2018 | Macannuco et al. |

(Continued)

FOREIGN PATENT DOCUMENTS

| | | |
|---|---|---|
| CN | 111145122 A | 5/2020 |
| EP | 2031559 A1 | 3/2009 |

OTHER PUBLICATIONS

Daniel Weiskopf & Thomas Ertl (2002) Real-Time Depth-Cueing beyond Fogging, Journal of Graphics Tools, 7:4, 83-90, DOI: 10.1080/10867651.2002.10487575.

*Primary Examiner* — Jayanti K Patel
(74) *Attorney, Agent, or Firm* — S.J. INTELLECTUAL PROPERTY LTD.

(57) ABSTRACT

A method and system for providing depth perception to a two-dimensional (2D) representation of a given three-dimensional (3D) object within a 2D non-visible spectrum image of a scene is provided. The method comprises: capturing the 2D non-visible spectrum image at a capture time, by at least one non-visible spectrum sensor; obtaining 3D data regarding the given 3D object independently of the 2D non-visible spectrum image; generating one or more depth cues based on the 3D data; applying the depth cues on the 2D representation to generate a depth perception image that provides the depth perception to the 2D representation; and displaying the depth perception image.

19 Claims, 4 Drawing Sheets

(56) References Cited

U.S. PATENT DOCUMENTS

| | | | |
|---|---|---|---|
| 2003/0014212 A1 | 1/2003 | Ralston | |
| 2005/0285356 A1* | 12/2005 | Malit | B60G 17/00 |
| | | | 280/5.518 |
| 2008/0123960 A1 | 5/2008 | Kim et al. | |
| 2010/0110308 A1* | 5/2010 | Nicholson | H04N 9/3164 |
| | | | 353/31 |
| 2010/0111370 A1* | 5/2010 | Black | G06F 18/2321 |
| | | | 705/26.1 |
| 2012/0323365 A1* | 12/2012 | Taylor | G05D 1/0225 |
| | | | 901/1 |
| 2013/0278597 A1 | 10/2013 | Sasaki | |
| 2015/0049308 A1* | 2/2015 | Mealing | G03B 17/54 |
| | | | 353/121 |
| 2015/0208054 A1 | 7/2015 | Michot | |
| 2015/0296200 A1* | 10/2015 | Grauer | G01S 17/18 |
| | | | 348/49 |
| 2016/0343169 A1* | 11/2016 | Mullins | G01S 17/89 |
| 2016/0371884 A1* | 12/2016 | Benko | G06T 19/006 |
| 2016/0379405 A1* | 12/2016 | Baca | A63F 13/52 |
| | | | 463/32 |
| 2017/0115395 A1* | 4/2017 | Grauer | G01S 17/89 |
| 2018/0176541 A1* | 6/2018 | Abbas | H04N 23/90 |
| 2019/0012828 A1 | 1/2019 | Jung et al. | |
| 2019/0122425 A1* | 4/2019 | Sheffield | H04N 13/243 |
| 2019/0170510 A1* | 6/2019 | Robinson | G01C 9/00 |
| 2019/0360810 A1 | 11/2019 | Johnson et al. | |

\* cited by examiner

METHODS AND SYSTEMS FOR ENHANCING DEPTH PERCEPTION OF A NON-VISIBLE SPECTRUM IMAGE OF A SCENE

TECHNICAL FIELD

The invention relates to methods and systems for enhancing a depth perception of a non-visible spectrum image of a scene.

BACKGROUND

Non-visible spectrum sensors (e.g., infrared sensors) can capture images that are not in the visible spectrum, i.e. non-visible spectrum images, in a wide variety of applications. However, non-visible spectrum images have poor depth perception. That is, a non-visible spectrum image poorly perceives three-dimensional (3D) features that are present within the scene that is displayed in the non-visible spectrum image.

Thus, there is a need in the art for new methods and systems for enhancing a depth perception of a non-visible spectrum image of a scene.

References considered to be relevant as background to the presently disclosed subject matter are listed below. Acknowledgement of the references herein is not to be inferred as meaning that these are in any way relevant to the patentability of the presently disclosed subject matter.

U.S. Pat. No. 6,157,733 ("Swain"), published on Dec. 5, 2000, discloses one or more monocular cues being extracted from an original image and combined to enhance depth effect. An original image is acquired and segmented into one or more objects. The objects are identified as being either in the foreground or the background, and an object of interest is identified. One or more depth cues are then extracted from the original image, including shading, brightness, blur and occlusion. The depth cues may be in the form of one or more intermediate images having an improved depth effect. The depth cues are then combined or applied to create an image with enhanced depth effect.

U.S. Patent Application Publication No. 2015/0208054 "Michot"), published on Jul. 23, 2015, discloses a method of generating a depth cue for three dimensional video content. The method comprises the steps of (a) detecting three dimensional video content that will appear in observer space when displayed; (b) identifying a reference projection parameter; (c) estimating a location of a shadow that would be generated by the detected content as a consequence of a light source emitting light according to the reference projection parameter; and (d) projecting light content imitating a shadow to the estimated location to coincide with display of the three dimensional video content. Also disclosed are a computer program product for carrying out a method of generating a depth cue for three dimensional video content and an apparatus for generating a depth cue for three dimensional video content.

GENERAL DESCRIPTION

In accordance with a first aspect of the presently disclosed subject matter, there is provided a method for providing depth perception to a two-dimensional (2D) representation of a given three-dimensional (3D) object within a 2D non-visible spectrum image of a scene, the method comprising: capturing the 2D non-visible spectrum image at a capture time, by at least one non-visible spectrum sensor; obtaining three-dimensional (3D) data regarding the given 3D object independently of the 2D non-visible spectrum image; generating one or more depth cues based on the 3D data; applying the depth cues on the 2D representation to generate a depth perception image that provides the depth perception to the 2D representation; and displaying the depth perception image.

In some cases, the 3D data is a priori data regarding coordinates of a fixed coordinate system established in space that are associated with the given 3D object, the a priori data being available prior to the capture time, and wherein the depth cues are generated based on the a priori data and an actual position and orientation of the non-visible spectrum sensor relative to the fixed coordinate system at the capture time.

In some cases, the 3D data is one or more readings by an additional sensor that is distinct from the non-visible spectrum sensor, and wherein the depth cues are generated based on the readings and a first actual position and orientation of the non-visible spectrum sensor at the capture time relative to a second actual position and orientation of the additional sensor at a second time of the readings.

In some cases, the 3D data is a priori data regarding coordinates of a fixed coordinate system established in space that are associated with the given 3D object, the a priori data being available prior to the capture time, and wherein the depth cues are generated prior to the capture time, based on the a priori data and an expected position and orientation of the non-visible spectrum sensor relative to the fixed coordinate system at the capture time.

In some cases, the method further comprises: recording the 2D non-visible spectrum image to provide a recording of the 2D non-visible spectrum image; wherein the depth cues are applied on the 2D representation within the 2D non-visible spectrum image as recorded.

In some cases, the additional sensor is one of: a depth sensor or an active 3D scanner.

In some cases, the active 3D scanner is a Light Detection and Ranging (LiDAR).

In some cases, the depth cues include one or more of the following: (a) one or more shadows; (b) a virtual object; or (c) contour lines.

In some cases, at least some of the shadows are generated by one or more virtual light sources.

In some cases, the method further comprises: selecting one or more selected light sources of the virtual light sources.

In some cases, the method further comprises: for at least one selected light source of the selected light sources, defining one or more parameters of the at least one selected light source, the one or more parameters including a position and an orientation of the at least one selected light source.

In some cases, for at least one selected light source of the selected light sources, one or more parameters of the at least one selected light source are defined by a user, the one or more parameters including a position and an orientation of the at least one selected light source.

In some cases, one or more selected light sources of the virtual light sources are selected by a user, and the user defines one or more parameters of the selected light sources, the one or more parameters including a position and an orientation of each selected light source of the selected light sources.

In some cases, at least some of the shadows are generated based on a known position and orientation of an existing light source that illuminates the scene at the capture time.

In some cases, the virtual object is distinguishable from the 2D representation.

In accordance with a second aspect of the presently disclosed subject matter, there is provided a method for enhancing a depth perception of a non-visible spectrum image of a scene, the method comprising: capturing the non-visible spectrum image at a capture time, by at least one non-visible spectrum sensor, the non-visible spectrum image including one or more objects; classifying one or more of the objects without deriving three-dimensional (3D) data from the non-visible spectrum image, giving rise to one or more classified objects; generating one or more depth cues based on one or more parameters associated with the classified objects; applying the depth cues to the non-visible spectrum image to generate an enhanced depth perception image having an enhanced depth perception relative to the non-visible spectrum image; and displaying the enhanced depth perception image.

In some cases, the depth cues include one or more of the following: (a) one or more shadows; (b) one or more virtual objects that are based on a corresponding one or more physical objects that are of a known size; (c) haze; or (d) perspective.

In some cases, at least some of the shadows are generated by one or more virtual light sources.

In some cases, at least some of the shadows are generated based on a known position and orientation of an existing light source that illuminates the scene at the capture time.

In accordance with a third aspect of the presently disclosed subject matter, there is provided a system for providing depth perception to a two-dimensional (2D) representation of a given three-dimensional (3D) object within a 2D non-visible spectrum image of a scene, the system comprising: at least one non-visible spectrum sensor configured to capture the 2D non-visible spectrum image at a capture time; and a processing circuitry configured to: obtain three-dimensional (3D) data regarding the given 3D object independently of the 2D non-visible spectrum image; generate one or more depth cues based on the 3D data; apply the depth cues on the 2D representation to generate a depth perception image that provides the depth perception relative to the 2D representation; and display the depth perception image.

In some cases, the 3D data is a priori data regarding coordinates of a fixed coordinate system established in space that are associated with the given 3D object, the a priori data being available prior to the capture time, and wherein the depth cues are applied based on the a priori data and an actual position and orientation of the non-visible spectrum sensor relative to the fixed coordinate system at the capture time.

In some cases, the 3D data is one or more readings by an additional sensor that is distinct from the non-visible spectrum sensor, and wherein the depth cues are generated based on the readings and a first actual position and orientation of the non-visible spectrum sensor at the capture time relative to a second actual position and orientation of the additional sensor at a second time of the readings.

In some cases, the 3D data is a priori data regarding coordinates of a fixed coordinate system established in space that are associated with the given 3D object, the a priori data being available prior to the capture time, and wherein the depth cues are generated prior to the capture time, based on the a priori data and an expected position and orientation of the non-visible spectrum sensor relative to the fixed coordinate system at the capture time.

In some cases, the processing circuitry is further configured to: record the 2D non-visible spectrum image to provide a recording of the 2D non-visible spectrum image; wherein the depth cues are applied on the 2D non-visible spectrum image as recorded.

In some cases, the additional sensor is one of: a depth sensor or an active 3D scanner.

In some cases, the active 3D scanner is a Light Detection and Ranging (LiDAR).

In some cases, the depth cues include one or more of the following: (a) one or more shadows; (b) a virtual object; or (c) contour lines.

In some cases, at least some of the shadows are generated by one or more virtual light sources.

In some cases, the processing circuitry is further configured to: select one or more selected light sources of the virtual light sources.

In some cases, the processing circuitry is further configured to: for at least one selected light source of the selected light sources, define one or more parameters of the at least one selected light source, the one or more parameters including a position and an orientation of the at least one selected light source.

In some cases, for at least one selected light source of the selected light sources, one or more parameters of the at least one selected light source are defined by a user of the system, the one or more parameters including a position and an orientation of the at least one selected light source.

In some cases, one or more selected light sources of the virtual light sources are selected by a user of the system, and the user defines one or more parameters of the selected light sources, the one or more parameters including a position and an orientation of each selected light source of the selected light sources.

In some cases, at least some of the shadows are generated based on a known position and orientation of an existing light source that illuminates the scene at the capture time.

In some cases, the virtual object is distinguishable from the 2D representation.

In accordance with a fourth aspect of the presently disclosed subject matter, there is provided a system for enhancing a depth perception of a non-visible spectrum image of a scene, the system comprising: at least one non-visible spectrum sensor configured to capture the non-visible spectrum image at a capture time, the non-visible spectrum image including one or more objects; and a processing circuitry configured to: classify one or more of the objects without deriving three-dimensional (3)) data from the non-visible spectrum image, giving rise to one or more classified objects; generate one or more depth cues based on one or more parameters of the classified objects; apply the depth cues to the non-visible spectrum image to generate an enhanced depth perception image having an enhanced depth perception relative to the non-visible spectrum image; and display the enhanced depth perception image.

In some cases, the depth cues include one or more of the following: (a) one or more shadows; (b) one or more virtual objects that are based on a corresponding one or more physical objects that are of a known size; (c) haze; or (d) perspective.

In some cases, at least some of the shadows are generated by one or more virtual light sources.

In some cases, at least some of the shadows are generated based on a known position and orientation of an existing light source that illuminates the scene at the capture time.

In accordance with a fifth aspect of the presently disclosed subject matter, there is provided a non-transitory computer readable storage medium having computer readable program code embodied therewith, the computer readable program code, executable by processing circuitry of a computer to perform a method for providing depth perception to a two-dimensional (2D) representation of a given three-dimensional (3D) object within a 2D non-visible spectrum image of a scene, the method comprising: capturing the 2D non-visible spectrum image at a capture time, by at least one non-visible spectrum sensor; obtaining three-dimensional (3D) data regarding the given 3D object independently of the 2D non-visible spectrum image; generating one or more depth cues based on the 3D data; applying the depth cues on the 2D representation to generate a depth perception image that provides the depth perception to the 2D representation; and displaying the depth perception image.

In accordance with a sixth aspect of the presently disclosed subject matter, there is provided a non-transitory computer readable storage medium having computer readable program code embodied therewith, the computer readable program code, executable by processing circuitry of a computer to perform a method for enhancing a depth perception of a non-visible spectrum image of a scene, the method comprising: capturing the non-visible spectrum image at a capture time, by at least one non-visible spectrum sensor, the non-visible spectrum image including one or more objects; classifying one or more of the objects without deriving three-dimensional (3D) data from the non-visible spectrum image, giving rise to one or more classified objects; generating one or more depth cues based on one or more parameters associated with the classified objects; applying the depth cues to the non-visible spectrum image to generate an enhanced depth perception image having an enhanced depth perception relative to the non-visible spectrum image; and displaying the enhanced depth perception image.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "capturing", "obtaining", "generating", "applying". "displaying", "recording", "classifying" or the like, include actions and/or processes, including, inter alia, actions and/or processes of a computer, that manipulate and/or transform data into other data, said data represented as physical quantities, e.g. such as electronic quantities, and/or said data representing the physical objects. The terms "computer", "processor", "processing circuitry" and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field-programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

As used herein, the phrase "for example," "such as", "for instance" and variants thereof describe non-limiting embodiments of the presently disclosed subject matter. Reference in the specification to "one case", "some cases". "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 1:
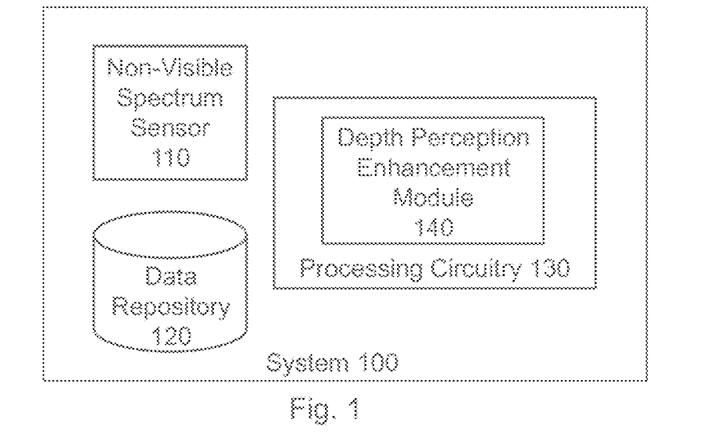
FIG. 1 is a block diagram schematically illustrating an example of a system for enhancing a depth perception of a non-visible spectrum image of a scene, in accordance with the presently disclosed subject matter.
Figure 2:
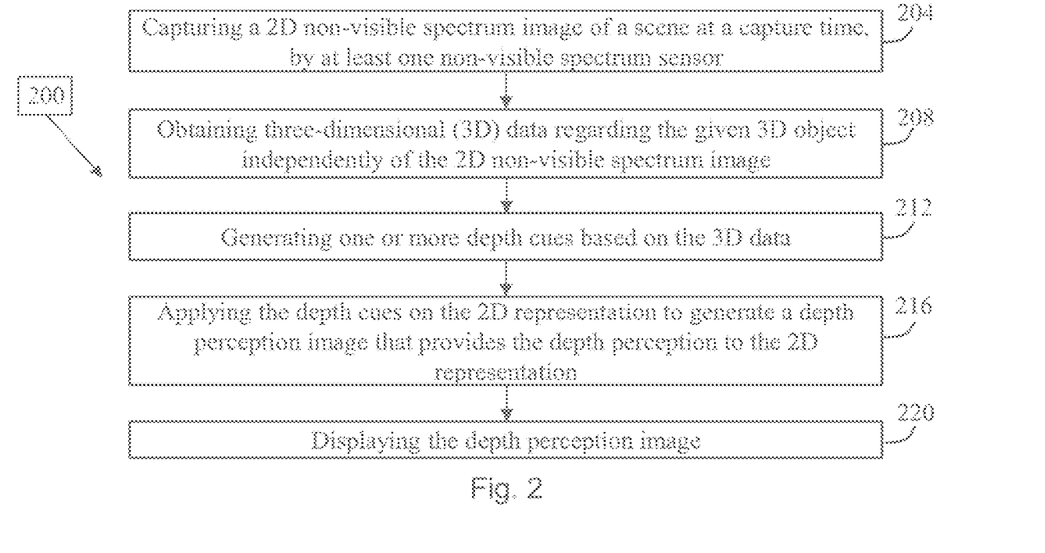
FIG. 2 is a flowchart illustrating a first example of a sequence of operations for enhancing a depth perception of a non-visible spectrum image of a scene, in accordance with the presently disclosed subject matter.
Figure 3:
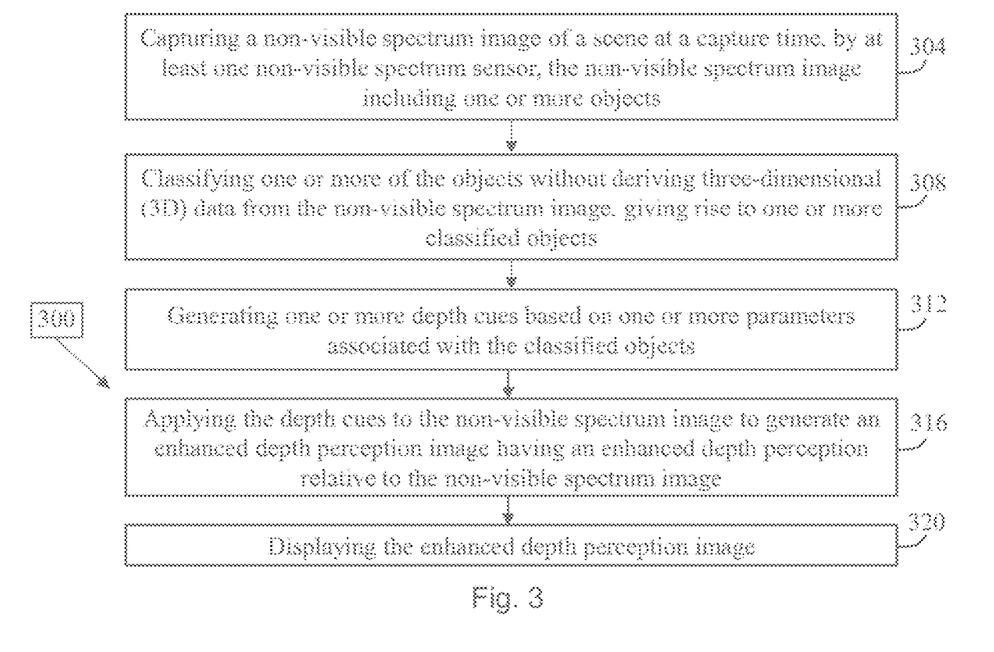
FIG. 3 is a flowchart illustrating a second example of a sequence of operations for enhancing a depth perception of a non-visible spectrum image of a scene, in accordance with the presently disclosed subject matter.

In embodiments of the presently disclosed subject matter, fewer, more and/or different stages than those shown in FIGS. 2 and 3 may be executed. In embodiments of the presently disclosed subject matter one or more stages illustrated in FIGS. 2 and 3 may be executed in a different order and/or one or more groups of stages may be executed simultaneously. FIGS. 1 and 4 to 7 illustrate a general schematic of the system architecture in accordance with embodiments of the presently disclosed subject matter. Each module in FIG. 1 can be made up of any combination of software, hardware and/or firmware that performs the functions as defined and explained herein. The modules in FIG. 1 may be centralized in one location or dispersed over more than one location. In other embodiments of the presently disclosed subject matter, the system may comprise fewer, more, and/or different modules than those shown in FIG. 1.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Attention is now drawn to FIG. 1, a block diagram schematically illustrating an example of a system 100 for enhancing a depth perception of a non-visible spectrum image of a scene, in accordance with the presently disclosed subject matter.

In accordance with the presently disclosed subject matter, system 100 can be configured to include at least one non-visible spectrum sensor 110. Non-visible spectrum sensor 110 can be configured to capture images that are not in the visible spectrum. i.e. non-visible spectrum images. In some cases, non-visible spectrum sensor 110 can be configured to capture infrared (IR) images, extremely high frequency (EHF) images or millimeter-wave (MMW) radar images. The non-visible spectrum images that are captured by non-visible spectrum sensor 110 generally have poor depth perception.

System 100 can further comprise or be otherwise associated with a data repository 120 (e.g. a database, a storage system, a memory including Read Only Memory—ROM, Random Access Memory—RAM, or any other type of memory, etc.) configured to store data. In some cases, the data stored can include three-dimensional (3D) data of part or all of a scene that is captured in a non-visible spectrum image, as detailed further herein, inter alia with reference to FIG. 2. In some cases, data repository 120 can be further configured to enable retrieval and/or update and/or deletion of the stored data. It is to be noted that in some cases, data repository 120 can be distributed.

System 100 can also be configured to include processing circuitry 130. Processing circuitry 130 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant system 100 resources and for enabling operations related to system 100 resources.

Processing circuitry 130 can be configured to include a depth perception enhancement module 140. Depth perception enhancement module 140 can be configured to apply depth cues to a non-visible spectrum image of a scene to generate an enhanced depth perception image, as detailed further herein, inter alia with reference to FIGS. 2 to 7.

In some cases, system 100 can be configured to include a synthetic image source (not shown in FIG. 1) for optically injecting the depth cues onto the non-visible spectrum image of the scene to generate the enhanced depth perception image, as detailed further herein, inter alia with reference to FIGS. 2 to 7.

Attention is now drawn to FIG. 2, a flowchart illustrating a first example of a sequence of operations 200 for enhancing a depth perception of a non-visible spectrum image of a scene, in accordance with the presently disclosed subject matter.

In accordance with the presently disclosed subject matter, the at least one non-visible spectrum sensor 110 can be configured to capture a non-visible spectrum image of a scene at a capture time. In some cases, the non-visible spectrum image can be a two-dimensional (2D) non-visible spectrum image (block 204t.

Processing circuitry 130 can be configured. e.g. using depth perception enhancement module 140, to obtain three-dimensional (3D) data of one or more regions within the scene independently of the non-visible spectrum image, the one or more regions comprising part or all of the scene. In some cases, the 3D data can be regarding one or more given 3D objects that have a 2D representation within the 2D non-visible spectrum image (block 208).

In some cases, the 3D data can include a priori data that is available to the system 100 (e.g., stored in the data repository 120) prior to the capture time, the a priori data being associated with coordinates of a fixed coordinate system established in space. The a priori data can be, for example, a stored terrain elevation model. In some cases, the 3D data can be a priori data regarding coordinates of a fixed coordinate system established in space that are associated with one or more given 3D objects that have a 2D representation within the 2D non-visible spectrum image.

Additionally, or alternatively, in some cases, at least some of the 3D data can be obtained from a depth sensor (not shown) that is distinct from non-visible spectrum sensor 110, based on one or more readings by the depth sensor. In some cases, the 3D data obtained from the depth sensor can be 3D data regarding one or more given 3D objects that have a 2D representation within the 2D non-visible spectrum image. In some cases, the depth sensor can be coupled to the non-visible spectrum sensor 110. Additionally, or as a further alternative, in some cases, at least some of the 3D data can be a 3D map that is generated based on readings obtained by an active 3D scanner (not shown) from at least one scan of one or more of the regions within the scene. In some cases, the 3D map can include 3D data regarding one or more given 3D objects that have a 2D representation within the 2D non-visible spectrum image. In some cases, the active 3D scanner can be coupled to the non-visible spectrum sensor 110. Additionally, or alternatively, in some cases, the active 3D scanner and the non-visible spectrum sensor 110 can be mounted on a common body. In some cases, the active 3D scanner can be a Light Detection and Ranging (LiDAR).

Processing circuitry 130 can be further configured, e.g. using depth perception enhancement module 140, to generate one or more depth cues based on the 3D data (block 212).

In some cases, one or more of the depth cues can be generated based on a priori data, as defined above, and an actual position and orientation of the non-visible spectrum sensor 110 relative to the fixed coordinate system at the capture time. Additionally, or alternatively, in some cases, one or more of the depth cues can be generated prior to the capture time, as defined above, based on a priori data, as defined above, and an expected position and orientation of non-visible spectrum sensor 110 relative to the fixed coordinate system at the capture time.

Additionally, or as a further alternative, in some cases, one or more of the depth cues can be generated based on readings by an additional sensor that is distinct from the non-visible spectrum sensor, for example, a depth sensor, as defined above, or an active 3D scanner, as defined above; a first actual position and orientation of the non-visible spectrum sensor at the capture time relative to a second actual position and orientation of the additional sensor at a second time of the readings by the additional sensor; and the actual position and orientation of the non-visible spectrum sensor 110 at the capture time.

In some cases, the non-visible spectrum image can capture one or more objects in the scene, if any (for example, a 2D representation of given 3D objects in the scene can be captured by a 2D non-visible spectrum image). In order to apply one or more depth cues to provide enhanced depth perception for a given object of the objects in the scene, the obtained 3D data of the scene can be correlated with the given object. For example, if the 3D data is a terrain elevation model, a location of the given object relative to the terrain elevation model can be determined. This can be achieved by calculating a location (i.e., position and orientation) of the non-visible spectrum sensor 110 relative to the given object at the capture time, the location of the non-visible spectrum sensor 110 relative to the terrain in the scene at the capture time being known. As an additional example, if the 3D data of the scene is obtained from readings of an additional sensor, i.e. a depth sensor or an active 3D scanner, a location of the given object relative to the 3D data of the scene can be determined by calculating a location (i.e., position and orientation) of the non-visible spectrum sensor 110 relative to the given object at the capture time, and the relation between the location of the non-visible spectrum sensor 110 at the capture time and the additional sensor at the time that readings associated with the given object are obtained by the additional sensor.

In some cases, certain objects in a scene can be considered to be of higher priority than other objects in the scene. In some cases, depth cues can be generated for the higher priority objects. For example, if the non-visible spectrum sensor 110 is mounted on an airborne platform (e.g., airplane, helicopter, drone, etc.), the objects in the scene that are present along the flight path of the airborne platform can be considered to be of a higher priority, and depth cues can be generated for these objects.

Processing circuitry 130 can be configured. e.g. using depth perception enhancement module 140, to apply the depth cues to the non-visible spectrum image to generate an enhanced depth perception image having an enhanced depth perception relative to the non-visible spectrum image. In some cases, the depth cues can be applied on one or more 2D representations, of a corresponding one or more given 3D objects, within the 2D non-visible spectrum image to generate a depth perception image that provides depth perception to the 2D representations (block 216).

In some cases, processing circuitry 130 can be configured to record the non-visible spectrum image (e.g., the 2D non-visible spectrum image) to provide a recorded non-visible spectrum image (e.g., a recording of the 2D non-visible spectrum image), and to apply at least one of the depth cues to the recorded non-visible spectrum image (e.g., on the 2D representations of the given 3D objects within the 2D non-visible spectrum image as recorded), thereby giving rise to the enhanced depth perception image.

In some cases, the depth cues can be applied to the non-visible spectrum image by overlaying the non-visible spectrum image with the depth cues (rather than modifying the non-visible spectrum image with the depth cues, e.g., merging the depth cues with the non-visible spectrum image). As a specific example, depth cues can be applied on a 2D representation of a given 3D object within a 2D non-visible spectrum image by overlaying the depth cues on the 2D non-visible spectrum image. The overlaying of the depth cues on the non-visible spectrum image can be performed, for example, by optically injecting the depth cues by a synthetic image source (not shown) and combining the depth cues with an unaltered non-visible spectrum image (i.e., overlaid on the non-visible spectrum image), e.g. by an optical combiner, to display an enhanced depth perception image to the user of the system 100, as detailed further herein, inter alia with reference to FIGS. 4 to 7. In this manner, the enhanced depth perception image of the scene can be displayed without latency.

In some cases, the depth cues can be overlaid onto the non-visible spectrum image within an eyepiece of an optical instrument that displays the enhanced depth perception image to the user of the system 100, as detailed further herein, inter alia with reference to FIGS. 4 to 7. In some cases, the optical instrument can be a night vision optical instrument.

In some cases, in which one or more depth cues are applied on a 2D representation of a given 3D object within the 2D non-visible spectrum image, the depth cues can be applied on the 2D representation by merging the depth cues with the 2D non-visible spectrum image.

Processing circuitry 130 can also be configured, e.g. using depth perception enhancement module 140, to display the enhanced depth perception image (block 220).

In some cases, the depth cues that are applied to (e.g., overlaid on or merged with) the non-visible spectrum image can include one or more shadows that are generated based on at least some of the 3D data, the shadows being configured to at least one of: (a) vary a brightness of pixels within the enhanced depth perception image relative to the non-visible spectrum image or (b) vary a color of pixels within the enhanced depth perception image relative to the non-visible spectrum image. For example, one or more shadows can be applied on a 2D representation of a given 3D object in a 2D non-visible spectrum image to provide depth perception to the 2D representation.

In some cases, at least some of the shadows can be generated by one or more virtual light sources. Additionally, or alternatively, in some cases, at least some of the shadows can be generated based on a known position and orientation of an existing light source (sun, moon, other light source, etc.) that illuminates the scene that is captured by the non-visible spectrum sensor 110.

In some cases, in which at least some of the shadows are generated by one or more virtual light sources, at least some of the virtual light sources can be selected by the processing circuitry 130, based on the 3D data. In some cases, processing circuitry 130 can further be configured to define at least some of the parameters of a respective virtual light source, of the virtual light sources that it selects, based on the 3D data. Additionally, or alternatively, in some cases, a user can define at least some of the parameters of a respective virtual light source, of the virtual light sources that are selected by processing circuitry 130, based on the 3D data. The parameters of a respective virtual light source can be, for example, a magnitude (e.g., intensity), a position and an orientation, and/or other characteristics of the respective virtual light source.

In some cases, in which at least some of the shadows are generated by one or more virtual light sources, at least some of the virtual light sources can be selected by a user, based on the 3D data. The user can also define the parameters of the virtual light sources that he/she selects, based on the 3D data.

In some cases, the depth cues that are applied to the non-visible spectrum image (e.g., are overlaid on the non-visible spectrum image) can include one or more virtual objects, the virtual objects being based on a corresponding one or more physical objects that are of a known size. Prior to applying the virtual objects to the non-visible spectrum image, an actual size of each of the virtual objects can be determined, e.g. by processing circuitry 130, in accordance with a known size of the physical object to which it corresponds, and a distance between the non-visible spectrum sensor 110 and a location within the non-visible spectrum image at which the respective virtual object is to be applied (i.e., overlaid).

In some cases, the depth cues that are applied on a 2D representation of a given 3D object in a 2D non-visible spectrum image can include a virtual object that is a 3D representation of the given 3D object.

In some cases, processing circuitry 130 can be configured to define one or more parameters that are associated with the virtual objects. Additionally, or alternatively, in some cases, a user can define one or more parameters that are associated with the virtual objects. The parameters that are associated with the virtual objects can be, for example, a type(s) (e.g., car, building, tree, stationary, moving, etc.), a number, a location and/or a distribution of the virtual objects.

In some cases, a moving virtual object can be added at a known distance from the non-visible spectrum sensor 110 to track movement in a location of the non-visible spectrum sensor 110 with respect to the scene that is captured by the non-visible spectrum sensor 110.

Moreover, processing circuitry 130 can be configured to apply the virtual objects to the non-visible spectrum image (e.g., merge the virtual objects with the non-visible spectrum image, overlay the virtual objects on the non-visible spectrum image, etc.), such that the virtual objects in the displayed enhanced depth perception image are distinguishable from real objects in the displayed enhanced depth perception image. In some cases, in which a virtual object that is a 3D representation of a given 3D object is applied on a 2D representation of the given 3D object in the 2D non-visible spectrum image, the virtual object can be applied such that the virtual object is distinguishable from the 2D representation.

In some cases, in which one or more depth cues are applied on a 2D representation of a given 3D object within the 2D non-visible spectrum image, the depth cues can include contour lines that provide a depth contour on the 2D representation.

In some cases, the depth cues that are applied to the non-visible spectrum image can include ha/e. Processing circuitry 130 can be configured to apply the haze to the non-visible spectrum image by altering one or more local characteristics of the non-visible spectrum image. In some cases, the local characteristics of the non-visible object that can be altered can be one or more of the following: (a) a Modulation Transfer Function (MTF) of the non-visible spectrum image, (b) one or more histogram distributions of the non-visible spectrum image, or (c) a change in a hue of the non-visible spectrum image, in the case of a color non-visible spectrum image. In some cases, the histogram distributions that can be altered to apply the haze to the non-visible spectrum image can include at least one of: a brightness histogram distribution or a contrast histogram distribution.

In some cases, the depth cues that are applied to the non-visible spectrum image can provide perspective. For example, the depth cues can include grid lines that are overlaid on the non-visible spectrum image.

Attention is now drawn to FIG. 3, a flowchart illustrating a second example of a sequence of operations for enhancing a depth perception of a non-visible spectrum image of a scene, in accordance with the presently disclosed subject matter.

In accordance with the presently disclosed subject matter, the at least one non-visible spectrum sensor 110 can be configured to capture a non-visible spectrum image of a scene at a capture time, the non-visible spectrum image including one or more objects (block 304).

Processing circuitry 130 can be configured, e.g. using depth perception enhancement module 140, to classify one or more of the objects without deriving three-dimensional (3D) data from the non-visible spectrum image, giving rise to one or more classified objects (block 308).

In some cases, the classified objects can be high priority objects in the scene. For example, if the non-visible spectrum sensor 110 is mounted on an airborne platform (e.g., airplane, helicopter, drone, etc.) flying along a flight path, the classified objects in the scene can be objects that are present along the flight path of the airborne platform.

Processing circuitry 130 can be further configured, e.g. using depth perception enhancement module 140, to generate one or more depth cues based on one or more parameters associated with the classified objects (block 312). The parameters associated with a given classified object of the classified objects can be, for example, a relation between a location (e.g., position and orientation) of the non-visible spectrum sensor 110 and the classified object (being indicative of a number of pixels in the non-visible spectrum image that are associated with the classified object), and an estimated height of the given classified object.

Processing circuitry 130 can be configured. e.g. using depth perception enhancement module 140, to apply the depth cues to the non-visible spectrum image to generate an enhanced depth perception image having an enhanced depth perception relative to the non-visible spectrum image (block 316).

In some cases, processing circuitry 130 can be configured to record the non-visible spectrum image to provide a recorded non-visible spectrum image, and to apply at least one of the depth cues to the recorded non-visible spectrum image, thereby giving rise to the enhanced depth perception image.

In some cases, the depth cues can be applied to the non-visible spectrum image by overlaying the non-visible spectrum image with the depth cues (rather than modifying the non-visible spectrum image with the depth cues). For example, the depth cues can be optically injected by a synthetic image source (not shown) and combined with an unaltered non-visible spectrum image (i.e., overlaid on the non-visible spectrum image), e.g. by an optical combiner, to display an enhanced depth perception image to the user of the system 100, as detailed further herein, inter alia with reference to FIGS. 4 to 7.

In some cases, the depth cues can be overlaid onto the non-visible spectrum image within an eyepiece of an optical instrument that displays the enhanced depth perception image to the user of the system 100, as detailed further herein, inter alia with reference to FIGS. 4 to 7. In some cases, the optical instrument can be a night vision optical instrument.

Processing circuitry 130 can also be configured, e.g. using depth perception enhancement module 140, to display the enhanced depth perception image (block 320).

In some cases, the depth cues that are applied to (e.g., overlaid on or merged with) the non-visible spectrum image can include one or more shadows that are generated based on the classified objects, the shadows being configured to at least one of: (a) vary a brightness of pixels within the enhanced depth perception image relative to the non-visible spectrum image or (b) vary a color of pixels within the enhanced depth perception image relative to the non-visible spectrum image. In some cases, at least some of the shadows can be generated by one or more virtual light sources. Additionally, or alternatively, in some cases, at least some of the shadows can be generated based on a known position and orientation of an existing light source (sun, moon, other light source, etc.) that illuminates the scene that is captured by the non-visible spectrum sensor 110.

In some cases, in which at least some of the shadows are generated by one or more virtual light sources, at least some of the virtual light sources can be selected by the processing circuitry 130, based on the classified objects. In some cases, processing circuitry 130 can further be configured to define at least some of the parameters of a respective virtual light source, of the virtual light sources that it selects, based on at least one of the parameters associated with the classified objects. Additionally. or alternatively, in some cases, a user can define at least some of the parameters of a respective virtual light source, of the virtual light sources that are selected by processing circuitry 130, based on at least one of the parameters associated with the classified objects. The parameters of a respective virtual light source can be, for example, a magnitude, a position and an orientation, and/or other characteristics of the respective virtual light source.

In some cases, in which at least some of the shadows are generated by one or more virtual light sources, at least some of the virtual light sources can be selected by a user, based on the classified objects. The user can also define the parameters of the virtual light sources that he/she selects, based on at least one of the parameters associated with the classified objects.

In some cases, the depth cues that are applied to the non-visible spectrum image (e.g., overlaid on the non-visible spectrum image) can include one or more virtual objects, the virtual objects being based on a corresponding one or more physical objects that are of a known size. Prior to applying the virtual objects to (e.g., overlaying the virtual objects on) the non-visible spectrum image, an actual size of each of the virtual objects can be determined, e.g. by processing circuitry 130, in accordance with a known size of the physical object to which it corresponds, and a distance between the non-visible spectrum sensor 110 and a location within the non-visible spectrum image at which the respective virtual object is to be applied (i.e., overlaid).

In some cases, processing circuitry 130 can be configured to define one or more parameters that are associated with the virtual objects. Additionally, or alternatively, in some cases, a user can define one or more parameters that are associated with the virtual objects. The parameters that are associated with the virtual objects can be, for example, a type(s) (e.g., car, building, tree, stationary, moving, etc.), a number, a location and/or a distribution of the virtual objects.

Moreover, processing circuitry 130 can be configured to display the virtual objects in the displayed enhanced depth perception image in a manner that distinguishes the virtual objects from real objects in the displayed enhanced depth perception image.

In some cases, the depth cues that are applied to (e.g., overlaid on) the non-visible spectrum image can include haze. In some cases, processing circuitry 130 can be configured to apply the haze to the non-visible spectrum image by altering one or more local characteristics of the non-visible spectrum image. In some cases, the local characteristics of the non-visible object that can be altered can be one or more of the following: (a) a Modulation Transfer Function (MTF) of the non-visible spectrum image, (b) one or more histogram distributions of the non-visible spectrum image, or (c) a change in a hue of the non-visible spectrum image, in the case of a color non-visible spectrum image. In some cases, the histogram distributions that can be altered to apply the haze to the non-visible spectrum image can include at least one of: a brightness histogram distribution or a contrast histogram distribution.

In some cases, the depth cues that are applied to the non-visible spectrum image can provide perspective. For example, the depth cues can include grid lines that are overlaid on the non-visible spectrum image.

It is to be noted that, with reference to FIGS. 2 and 3, some of the blocks can be integrated into a consolidated block or can be broken down to a few blocks and/or other blocks may be added. Furthermore, in some cases, the blocks can be performed in a different order than described herein. It is to be further noted that some of the blocks are optional. It should be also noted that whilst the flow diagram is described also with reference to the system elements that realizes them, this is by no means binding, and the blocks can be performed by elements other than those described herein.

Figure 4:
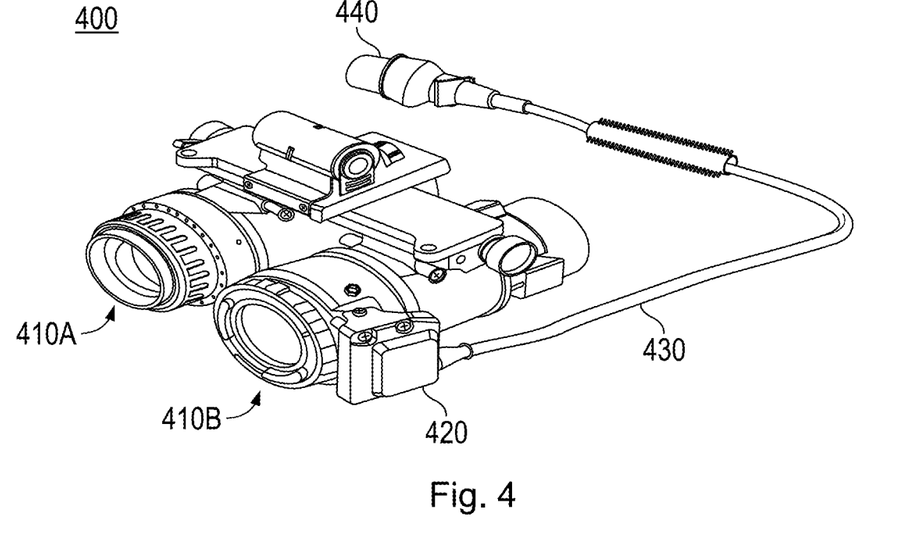
FIG. 4 is a schematic diagram illustrating a schematic optical instrument for displaying an enhanced depth perception image of the scene, in accordance with the presently disclosed subject matter.

Attention is now drawn to FIG. 4, a schematic diagram illustrating a schematic optical instrument 400 for displaying an enhanced depth perception image of the scene, in accordance with the presently disclosed subject matter.

In accordance with the presently disclosed subject matter, optical instrument 400 can be configured to include a regular eyepiece 410A and an enhanced eyepiece 410B. Enhanced eyepiece 410B can be configured to overlay the non-visible spectrum image with depth cues, as detailed further herein, inter alia with reference to FIG. 7.

In some cases, enhanced eyepiece 410B can be configured to include a synthetic image source 420. Synthetic image source 420 can be configured to inject the depth cues to be overlaid on the non-visible spectrum image. In some cases, synthetic image source 420 can include a liquid crystal display (LCD) (not shown) and processing circuitry (not shown). In some cases, as illustrated in FIG. 4, synthetic image source 420 can be connected, via cable 430, to a power source 440.

Figure 5:
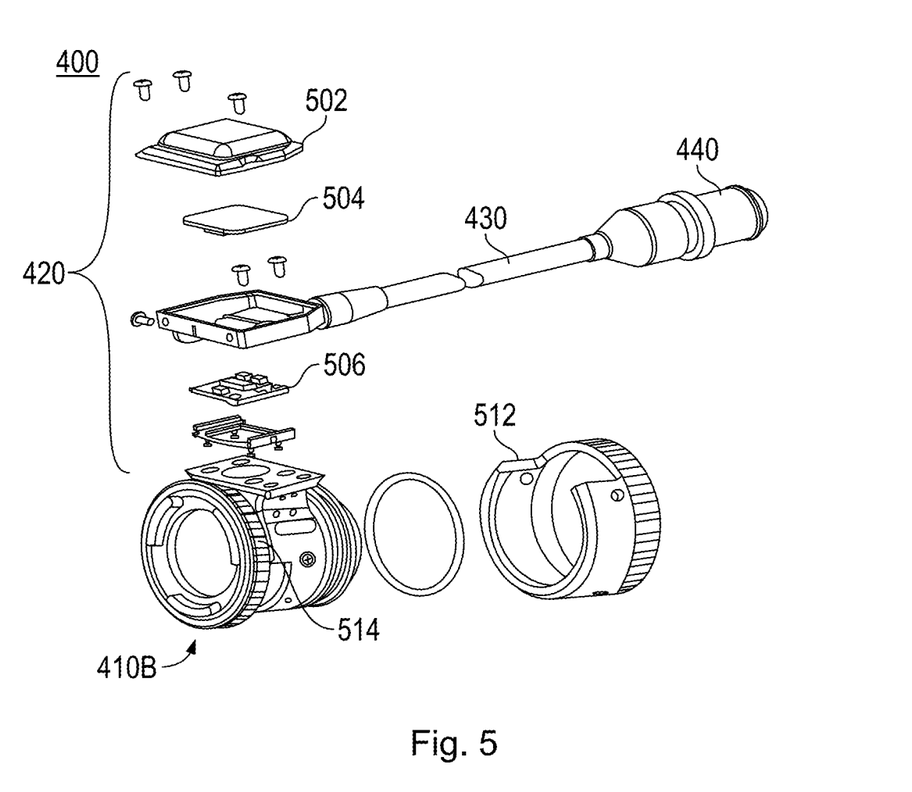
FIG. 5 is a schematic diagram illustrating an exploded view of an enhanced eyepiece of the schematic optical instrument, in accordance with the presently disclosed subject matter.

Attention is now drawn to FIG. 5, a schematic diagram illustrating an exploded view of an enhanced eyepiece 410B of the schematic optical instrument 400, in accordance with the presently disclosed subject matter.

In accordance with the presently disclosed subject matter, enhanced eyepiece 410B can be configured to include a synthetic image source 420. In some cases, synthetic image source 420 can be configured to include a casing 502, a backlight unit 504, and a liquid crystal display (LCD) 506. Power source 444) can be configured to feed the backlight unit 504 and the LCD 506 via cable 430. Mechanically, coupling means 512 can be configured to connect enhanced eyepiece 410B to an objective side of the optical instrument 400.

In some cases, enhanced eyepiece 410B can be configured to include a diopter setting ring 514. Diopter setting ring 514 can be configured to set a diopter of an adjustable lens within the enhanced eyepiece 410B for both the depth cues and the non-visible sensor image.

Figure 6:
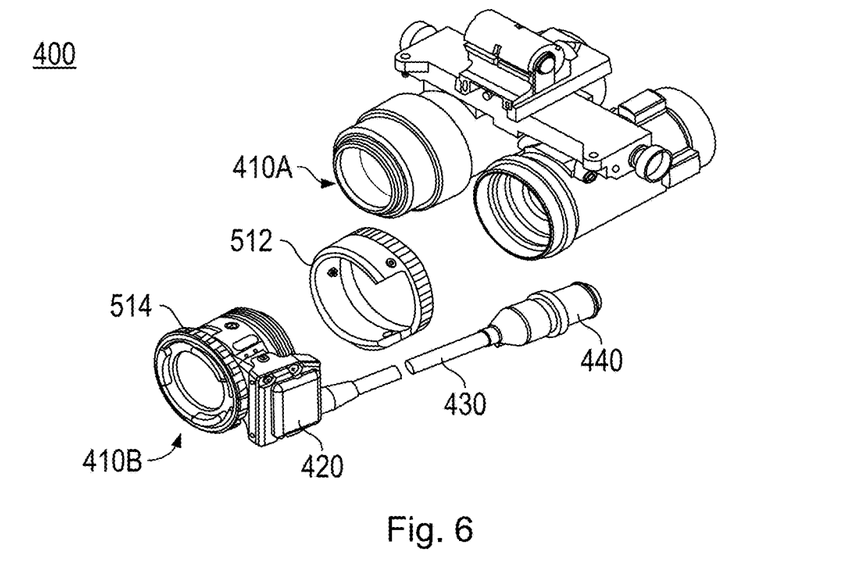
FIG. 6 is a schematic diagram illustrating another perspective of the schematic optical instrument, in accordance with the presently disclosed subject matter.

Attention is now drawn to FIG. 6, a schematic diagram illustrating another perspective of the schematic optical instrument 400, in accordance with the presently disclosed subject matter.

In accordance with the presently disclosed subject matter, schematic optical instrument 400 can be configured to include a regular eyepiece 410A and an enhanced eyepiece 410B. Enhanced eyepiece 410B can be configured to include a synthetic image source 420, coupling means 512, and a diopter setting ring 514, as detailed earlier herein, inter alia with reference to FIG. 5. Synthetic image source 420 can be connected, via cable 430, to a power source 440, as detailed earlier herein, inter alia with reference to FIG. 5.

Figure 7:
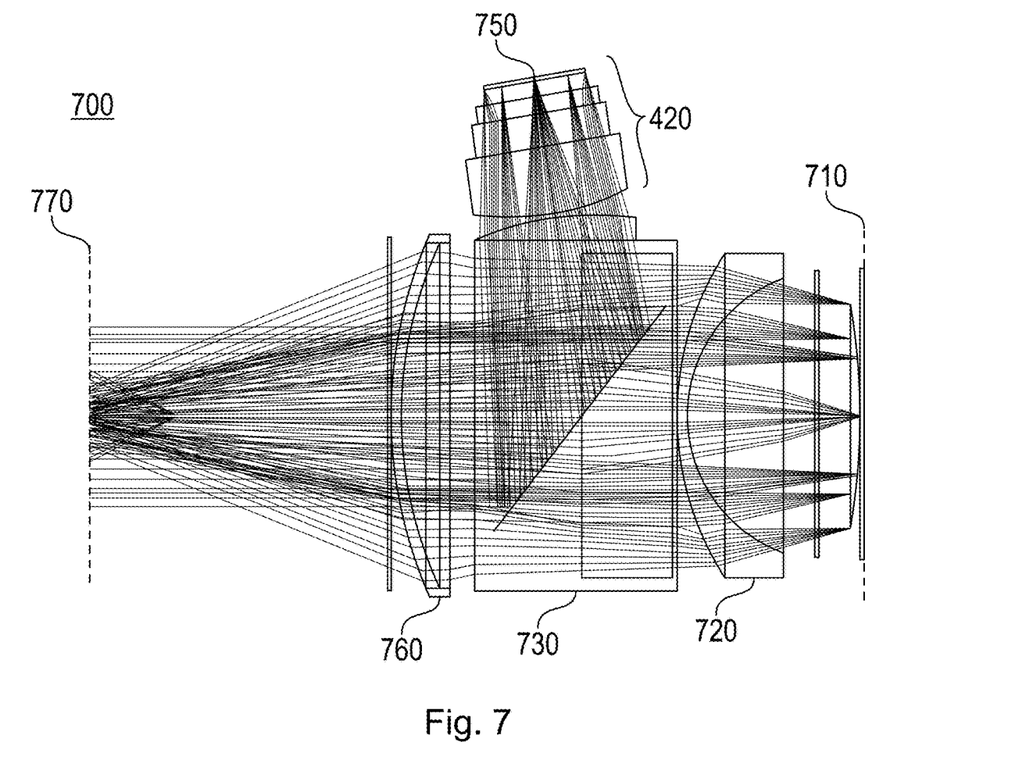
FIG. 7 is an optical diagram illustrating optical components of the enhanced eyepiece, in accordance with the presently disclosed subject matter.

Attention is now drawn to FIG. 7, an optical diagram 700 illustrating optical components of the enhanced eyepiece 410B, in accordance with the presently disclosed subject matter.

In accordance with the presently disclosed subject matter, in some cases, enhanced eyepiece 410B can be configured to include an objective-side lens 720; an observer-side lens 760; and an optical combiner 730 positioned between the objective-side lens 720 and the observer-side lens 760. Objective-side lens 720 can be configured to obtain the non-visible spectrum image of the scene 710. Optical combiner 730 can be configured to transfer the non-visible spectrum image from the objective-side lens 720 to the observer-side lens 760. Moreover, optical combiner 730 can be configured to reflect the depth cues (e.g., generated by a synthetic image source 420) towards the observer-side lens 760. Synthetic image source 420 can be configured to include an image emitting source 750 for emitting the depth cues, as illustrated in FIG. 7. In some cases, a diopter setting ring 514 can be configured to set a diopter of an adjustable lens within the enhanced eyepiece 410B to accurately overlay the non-visible sensor image with the depth cues. The overlaying of the non-visible sensor image with the depth cues results in an enhanced depth perception image being displayed to the user (at 770).

In some cases, system 100 can be configured to record the non-visible spectrum image that is output by the objective-side lens 720, using a video recorder (not shown).

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A method for providing depth perception to a two-dimensional (2D) representation of a given three-dimensional (3D) object within a 2D non-visible spectrum image of a scene, the method comprising:
   capturing the 2D non-visible spectrum image at a capture time, by at least one non-visible spectrum sensor;
   obtaining 3D data regarding the given 3D object independently of the 2D non-visible spectrum image;
   generating one or more depth cues based on the 3D data;
   applying the depth cues on the 2D representation to generate a depth perception image that provides the depth perception to the 2D representation; and
   displaying the depth perception image.

2. The method of claim 1, wherein the 3D data is a priori data regarding coordinates of a fixed coordinate system established in space that are associated with the given 3D object, the a priori data being available prior to the capture time; and
   wherein the depth cues are generated based on the a priori data and an actual position and orientation of the non-visible spectrum sensor relative to the fixed coordinate system at the capture time.

3. The method of claim 1, wherein the 3D data is one or more readings by an additional sensor that is distinct from the non-visible spectrum sensor; and
   wherein the depth cues are generated based on the readings and a first actual position and orientation of the non-visible spectrum sensor at the capture time relative to a second actual position and orientation of the additional sensor at a second time of the readings.

4. The method of claim 1, further comprising:
   recording the 2D non-visible spectrum image to provide a recording of the 2D non-visible spectrum image;
   wherein the depth cues are applied on the 2D representation within the 2D non-visible spectrum image as recorded.

5. The method of claim 1, wherein the depth cues include one or more of the following:
   (a) one or more shadows;
   (b) a virtual object; or
   (c) contour lines.

6. The method of claim 5, wherein at least some of the shadows are generated by one or more virtual light sources.

7. The method of claim 6, further comprising:
   selecting one or more selected light sources of the virtual light sources.

8. The method of claim 7, wherein, for at least one selected light source of the selected light sources, one or more parameters of the at least one selected light source are defined by a user, the one or more parameters including a position and an orientation of the at least one selected light source.

9. The method of claim 5, wherein the virtual object is distinguishable from the 2D representation.

10. A system for providing depth perception to a two-dimensional (2D) representation of a given three-dimensional (3D) object within a 2D non-visible spectrum image of a scene, the system comprising:
  at least one non-visible spectrum sensor configured to capture the 2D non-visible spectrum image at a capture time; and
  a processing circuitry configured to:
    obtain 3D data regarding the given 3D object independently of the 2D non-visible spectrum image;
    generate one or more depth cues based on the 3D data;
    apply the depth cues on the 2D representation to generate a depth perception image that provides the depth perception to the 2D representation; and
    display the depth perception image.

11. The system of claim 10, wherein the 3D data is a priori data regarding coordinates of a fixed coordinate system established in space that are associated with the given 3D object, the a priori data being available prior to the capture time; and
  wherein the depth cues are applied based on the a priori data and an actual position and orientation of the non-visible spectrum sensor relative to the fixed coordinate system at the capture time.

12. The system of claim 10, wherein the 3D data is one or more readings by an additional sensor that is distinct from the non-visible spectrum sensor; and
  wherein the depth cues are generated based on the readings and a first actual position and orientation of the non-visible spectrum sensor at the capture time relative to a second actual position and orientation of the additional sensor at a second time of the readings.

13. The system of claim 10, wherein the processing circuitry is further configured to:
  record the 2D non-visible spectrum image to provide a recording of the 2D non-visible spectrum image;
  wherein the depth cues are applied on the 2D non-visible spectrum image as recorded.

14. The system of claim 10, wherein the depth cues include one or more of the following:
  (a) one or more shadows;
  (b) a virtual object; or
  (c) contour lines.

15. The system of claim 14, wherein at least some of the shadows are generated by one or more virtual light sources.

16. The system of claim 15, wherein the processing circuitry is further configured to:
  select one or more selected light sources of the virtual light sources.

17. The system of claim 16, wherein, for at least one selected light source of the selected light sources, one or more parameters of the at least one selected light source are defined by a user of the system, the one or more parameters including a position and an orientation of the at least one selected light source.

18. The system of claim 14, wherein the virtual object is distinguishable from the 2D representation.

19. A non-transitory computer readable storage medium having computer readable program code embodied therewith, the computer readable program code, executable by processing circuitry of a computer to perform a method for providing depth perception to a two-dimensional (2D) representation of a given three-dimensional (3D) object within a 2D non-visible spectrum image of a scene, the method comprising:
  capturing the 2D non-visible spectrum image at a capture time, by at least one non-visible spectrum sensor;
  obtaining 3D data regarding the given 3D object independently of the 2D non-visible spectrum image;
  generating one or more depth cues based on the 3D data;
  applying the depth cues on the 2D representation to generate a depth perception image that provides the depth perception to the 2D representation; and
  displaying the depth perception image.

* * * * *